US009834636B2

(12) United States Patent
Lühmann et al.

(10) Patent No.: US 9,834,636 B2
(45) Date of Patent: Dec. 5, 2017

(54) SHEAR-RESISTANT PRESSURE-SENSITIVE ADHESIVE WITH HIGH TACK

(71) Applicant: TESA SE, Norderstedt (DE)

(72) Inventors: Bernd Lühmann, Norderstedt (DE); Alexander Prenzel, Hamburg (DE); Benjamin Pütz, Hamburg (DE); Helmut Ritter, Woppertal (DE); Stephan Zöllner, Buchholz/Nordheide (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/104,323

(22) PCT Filed: Nov. 19, 2014

(86) PCT No.: PCT/EP2014/075022
§ 371 (c)(1),
(2) Date: Jun. 14, 2016

(87) PCT Pub. No.: WO2015/090820
PCT Pub. Date: Jun. 25, 2015

(65) Prior Publication Data
US 2016/0311956 A1 Oct. 27, 2016

(30) Foreign Application Priority Data
Dec. 18, 2013 (DE) .................. 10 2013 226 504

(51) Int. Cl.
B32B 27/00 (2006.01)
B32B 7/12 (2006.01)
C08F 265/06 (2006.01)
C09J 151/00 (2006.01)
C09J 7/02 (2006.01)
B32B 27/08 (2006.01)
B32B 27/30 (2006.01)

(52) U.S. Cl.
CPC ............ *C08F 265/06* (2013.01); *B32B 7/12* (2013.01); *B32B 27/08* (2013.01); *B32B 27/308* (2013.01); *C09J 151/003* (2013.01); B32B 2307/718 (2013.01); B32B 2405/00 (2013.01)

(58) Field of Classification Search
CPC .. C09J 151/003; C09J 133/00; C09J 133/802; C09J 133/04; C09J 133/064; C08F 20/06; C08F 20/04; C08F 20/10; C08F 265/06
See application file for complete search history.

(56) References Cited

U.S. PATENT DOCUMENTS

| 6,106,820 | A | 8/2000 | Morrissey et al. |
| 6,248,826 | B1 * | 6/2001 | Solomon ............... C08F 220/04 524/556 |
| 9,260,637 | B2 | 2/2016 | Ellringmann et al. |
| 2005/0064181 | A1 | 3/2005 | Blank et al. |
| 2009/0277562 | A1 | 11/2009 | Ellringmann et al. |

FOREIGN PATENT DOCUMENTS

| CN | 1259862 A | 7/2000 |
| EP | 1 465 778 B1 | 4/2007 |
| EP | 2 116 584 A1 | 11/2009 |
| EP | 2 226 372 A1 | 9/2010 |

OTHER PUBLICATIONS

International Search Report dated Feb. 16, 2015, dated Feb. 25, 2015.
English Translation of International Search Report dated Feb. 16, 2015, dated Feb. 25, 2015.
German Search Report dated Aug. 11, 2014.
Chinese Office Action corresponds to Chinese application No. 201480069927.9 dated Apr. 1, 2017.

* cited by examiner

*Primary Examiner* — Irina S Zemel
*Assistant Examiner* — Jeffrey Lenihan
(74) *Attorney, Agent, or Firm* — Norris McLaughlin & Marcus P.A.

(57) ABSTRACT

Crosslinked pressure-sensitive adhesives (PSAs) based on polymers of branched macromolecules each comprising a main chain and one or more sidechains pendent to the main chain, the constitutional units thereof originating from a) X wt % of one or more acrylic and/or methacrylic esters, with $80 \leq X \leq 99.5$; b) Y wt % of radically copolymerizable monomers having at least one acid function, with $0.5 \leq Y \leq 15$; c) Z wt % of vinyl compounds, with $0 \leq Z \leq 5$, at least one sidechain pendent to the main chain having a number-average molar mass $\geq 1000$ g/mol, and the respective amounts of constitutional units originating from a), b) and c) can be the same in each case or differ by not more than 1%, and where a), b) and c) may in each case be the same or different monomers, have detachment properties which can be set independently of one another.

17 Claims, No Drawings

SHEAR-RESISTANT PRESSURE-SENSITIVE ADHESIVE WITH HIGH TACK

This is a 371 of PCT/EP2014/075022 filed 19 Nov. 2014, which claims foreign priority benefit under 35 U.S.C. 119 of German Patent Application 10 2013 226 504.2 filed Dec. 18, 2013, the entire contents of which are incorporated herein by reference.

As a result of the requirement for high efficiency and economy, new demands are always being made in industry of adhesive tapes. This is the case in particular for adhesive tapes which are to be removed from the substrate again after a short or even a longer period of bonding. Parameters such as the force which must be applied in order to initiate detachment and the overall detachment work, but also the stability of the adhesive tape that is to be removed and the amount of adhesive residues that remain on the substrate, play a part here.

Removable adhesive tapes are subjected to high stress even during bonding. The adhesive forces should generally not be too great, so that the adhesive tape can be removed in the first place, but, on the other hand, the bond must have the strength required for the intended use.

An illustrative example of the demands that are made of a removable or reversible bond is the bonding of printing plates, that is to say the bonding of flexible printing plates to printing cylinders in the printing industry. In this case, the adhesive tapes must on the one hand compensate for the restoring forces of the plates (the so-called "repulsion resistance"), so that there is no lifting of the edges of the plates bent to the periphery of the cylinders—such lifting of the plates would result in the printed image being unacceptably impaired. On the other hand, however, it must be possible to remove the plates from the cylinder without leaving a residue, wherein a further difficulty is that such cylinders can be made of different materials such as steel, polyurethane and the like, and the adhesive tapes are to be used as universally as possible.

Removable pressure-sensitive adhesives have a large number of uses in particular also where bonding is to be effected for only a defined period of time, for example where two workpieces are provisionally to be bonded together until permanent fixing is established, where identification by means of a label is to be attached for only for a temporary period of time, or the like.

As already mentioned, two parameters inter alia play a part in detachment processes, namely the initial force which must be applied in order to begin the detachment process (this is generally also the greatest force which must be applied during the detachment operation, that is to say the so-called maximum force), as well as the total work which is to be applied in total in order to detach the adhesive bond completely (that is to say the integral of the force to be applied over the detachment time). It has been found that these parameters are usually related: If the adhesive is so adjusted that the initial force is low, then the total detachment work generally also falls; if, on the other hand, an adhesive is designed with a high maximum force, that is to say initial force, then the total work to be applied for detachment is also high.

It can, however, be desirable to adjust those parameters independently of each other, for example if a high initial force is desired so that a bond does not begin to detach by itself, but a low total work for complete detachment is desirable (that is to say complete detachment is to be "easy"); or if a low force to initiate the operation of detaching a bond is desired, but the total work may be numerically high, since the detachment operation is carried out slowly and over a correspondingly long period of time and therefore the forces at any individual point in time are not too great. In practice, it has been found to be difficult to find corresponding adhesives.

Accordingly, the object of the invention is to provide pressure-sensitive adhesives—in particular reversibly bondable pressure-sensitive adhesives—in which the initial force which must be applied in order to initiate the detachment operation, and the total work for the detachment operation, can be adjusted independently of each other. In addition, it is an object of the invention to find polymers that can be used to produce the corresponding pressure-sensitive adhesives.

Surprisingly, it has been found that the desired properties are exhibited in particular by crosslinked pressure-sensitive adhesives based on polyacrylate-based branched polymers in which the macromolecules have at least one side chain having a number-average molar mass of 1000 g/mol or more if acid units have been used for crosslinking of the polymer—in particular by means of suitable crosslinker substances—both in the main chain and in the side chain or chains of the mentioned length.

There is accordingly provided according to the invention a polymer which is suitable for the production of such pressure-sensitive adhesives. Such a polymer consists of branched macromolecules each comprising a main chain and one or more side chains located on the main chain, wherein the constitutional units of the macromolecules are attributable to the following monomers a) X % by weight of one or more acrylic acid esters and/or methacrylic acid esters, wherein $80 \leq X \leq 99.5$;

b) Y % by weight radically copolymerizable monomers having at least one acid function, wherein $0.5 \leq Y \leq 15$;

c) Z % by weight vinyl compounds, wherein $0 \leq Z \leq 5$ and $X+Y+Z=100$, wherein at least one of the side chains located on the main chain has a number-average molar mass of at least 1000 g/mol, and that the content X, Y and Z of constitutional units attributable to the individual monomers a), b) and c) both in the main chain and in the side chains having a number-average molar mass of at least 1000 g/mol in total can in each case be the same or different, wherein, in the case where the content is different, an upwards or downwards deviation of not more than 1% is possible in each case, wherein the monomers a), b) and c) for the main chain and side chains can in each case be the same monomers or different monomers.

This means that the proportion of constitutional units attributable to the individual monomers a), b) and optionally c) in the resulting polymer of branched macromolecules is the same or at least substantially the same in the main chain as that in the side chains, wherein the sum of all the side chains of a molecule is to be taken into consideration, namely of those side chains whose number-average molar mass is at least 1000 g/mol. The monomers or monomer mixtures a), b) and c) can be different for the main chain and the side chain. Preferably, however, the same monomers or monomer mixtures are used, so that both the main chain and the side chains are composed of the same constitutional units. The same is true for the content of the individual monomer components X, Y and Z. The proportion thereof can be different in the main chain and in the side chains, wherein a deviation by up to 1%, based on the total mixture of components a), b) and c), is possible. This means that, for example, 90% of monomer component a) and 10% of monomer component b) are present in the main chain, while only 89% of monomer component a) but 11% of monomer component b) are present in the side chain. Particular preference is given, however, to those embodiments in which the content Y of monomer component b) corresponds, and particular preference is given to those in which the contents X, Y and Z of monomer components a), b) and c) correspond.

The invention relates further to a process for the preparation of such a polymer, wherein the polymer is produced by free radical polymerization from a monomer mixture comprising
A) W % by weight [based on the monomer mixture comprising monomer groups A and B] of the following monomers
   a) X % by weight [based on monomer group A] of one or more acrylic acid esters and/or methacrylic acid esters, wherein $80 \leq X \leq 99.5$;
   b) Y % by weight [based on monomer group A] radically copolymerizable monomers having at least one acid function, wherein $0.5 \leq Y \leq 15$;
   c) Z % by weight [based on monomer group A] vinyl compounds, wherein $0 \leq Z \leq 5$ and
B) (100-W) % by weight [based on the monomer mixture comprising monomer groups A and B] of the following macromonomers
   d) macromonomers terminally functionalized with groups containing at least one ethylenic double bond and the number-average molecular weight of which is 1000 g/mol or more and the constitutional units of which are in turn attributable to the monomers
     a) X % by weight of one or more acrylic acid esters and/or methacrylic acid esters, wherein $80 \leq X \leq 99.5$;
     b) Y % by weight radically copolymerizable monomers having at least one acid function, wherein $0.5 \leq Y \leq 15$;
     c) Z % by weight vinyl compounds, wherein $0 \leq Z \leq 5$,
wherein $80 \leq W \leq 95$,
wherein the monomers a), b) and c) for monomer group A and monomer group B can in each case be the same monomers or different monomers, and
wherein the amounts X, Y and Z of monomers a), b) and c) for monomer group A and monomer group B can in each case be the same or different.

This means that in a radical polymerization reaction, a monomer group A is reacted with a monomer group B, wherein the monomers of monomer group A are still present as monomers while the monomers of monomer group B are macromonomers. The weight ratio of the monomers of which the macromonomers B are composed can correspond to the weight ratio of the monomers A used as monomers, or the weight ratios can be different. Preference is given to embodiments in which the weight ratio of the monomers of which the macromonomers B are composed corresponds substantially to the weight ratio of the monomers that are used as monomers A, that is to say the weight ratios are the same or differ by not more than 1%, based on the total mixture of components a), b) and c), and particular preference is given to embodiments in which the weight ratios correspond. The monomers or monomer mixtures a), b) and c) can be different for the main chain and the side chain. Preferably, however, the same monomers or monomer mixtures are used, so that both the main chain and the side chains are composed of the same constitutional units.

The division into the monomer groups A and B (macromonomers) is made merely for formal reasons in order to give a clearer indication of the respective proportions of the monomers.

Within the scope of this specification, macromonomers are also referred to synonymously as macromers.

Finally, the invention relates to advantageous embodiments of the polymer according to the invention and to the preparation according to the invention of such polymers.

In particular as a result of so-called backbiting, short chain units in both the main chains and the long side chains (here the side chains having a mean molecular weight of at least 1000 g/mol) can be rearranged, leading to the formation of individual short side chains which can each have a length of a few constitutional units. Such short side chains are not important for the teaching of the invention and are regarded within the scope of this specification as belonging to the particular base body (main chain or long side chain) to which they are attached. Only the side chains having a number-average molecular weight of more than 1000 g/mol are regarded as being important for the invention.

Any reference within the scope of this specification to the amount in the side chains of a constitutional unit attributable to a type of monomer or to a specific monomer means the amount obtained by adding together the corresponding constitutional units in all the side chains of a macromolecule that are important for the invention and not the amount in an individual side chain.

In an advantageous embodiment of the invention, the polymers according to the invention have on average preferably from 1 to 5, particularly preferably from 1 to 3, side chains with $M_n > 1000$ g/mol per macromolecule (polymer molecule).

Preference is further given to those polymers whose number-average molecular weight is between 100 000 g/mol and 1 500 000 g/mol, particularly preferably between 200 000 g/mol and 800 000 g/mol.

Data relating to molar masses (number-average and weight-average) and polydispersities within the scope of this specification relate to determination by gel permeation chromatography. The determination is carried out on 100 µl of sample clarified by filtration (sample concentration 4 g/l). Tetrahydrofuran with 0.1% by volume trifluoroacetic acid is used as eluent. The measurement is carried out at 25° C. There is used as the pre-column a type PSS-SDV column, 5µ, $10^3$ Å, ID 8.0 mm×50 mm. For the separation there are used columns of type PSS-SDV, 5µ, $10^3$ Å and 105 Å and 106 Å with in each case ID 8.0 mm×300 mm (columns from Polymer Standards Service; detection by means of Shodex RI71 differential refractometer). The throughput is 1.0 ml per minute. Calibration is made based on PMMA standards (polymethyl methacrylate calibration).

The molar masses of the side chains whose number-average molar mass is at least 1000 g/mol or more correspond to the molar masses of the macromonomers used as component d) in the preparation of the polymers.

Pressure-sensitive adhesives (PSA) are in particular polymeric compositions which—optionally by the addition of suitable further components, such as, for example, adhesive resins—are permanently tacky and permanently adhesive at the application temperature (unless defined otherwise, at room temperature, that is to say 23° C.) and adhere to a large number of surfaces on contact, in particular adhere instantly (have a so-called "tack" [adhesiveness or contact adhesiveness]). They are capable, even at the application temperature without activation by solvents or by heat—but conventionally through the influence of a more or less high pressure— of wetting a substrate to be bonded sufficiently that interactions are able to form between the composition and the substrate that are sufficient for adhesion. Important influencing factors are inter alia the pressure and the contact time. The particular properties of pressure-sensitive adhesives are due inter alia in particular to their viscoelastic properties.

Pressure-sensitive adhesives can in principle be produced on the basis of polymers of different chemical natures. The pressure-sensitive adhesive properties are influenced inter alia by the type and the relative proportions of the monomers used in the polymerization of the polymers underlying the pressure-sensitive adhesive, the mean molar mass and molar mass distribution thereof as well as by the type and amount of the additives of the pressure-sensitive adhesive, such as adhesive resins, plasticizers and the like.

Pressure-sensitive adhesives consequently conventionally comprise a polymer component of a polymer or a blend (a mixture) of a plurality of polymers, wherein the polymer component itself may or may not already be pressure-sensitively adhesive, and optionally a resin component and/or additives which serve to produce or adjust the pressure-sensitive adhesive properties and the chemical and/or physical properties that are otherwise desired. Within the scope of this specification, resins are regarded as being in particular those oligomeric and (low) polymeric compounds—usually of amorphous structure—whose number-average molecular weight $M_n$ is not more than 5000 g/mol. Short-chained polymerization products which form in the polymerization of the above-defined monomer mixture for the preparation of the polymer component of the pressure-sensitive adhesive according to the invention are, of course, not subsumed under the term "resins". Tackifying resins—also referred to as adhesive resins—frequently have softening points in the range of from 80 to 150° C., without wishing to be limited to this range in the definition. Details of the softening point $T_E$ of oligomeric and polymeric compounds, such as, for example, of the resins, relate to the ring-and-ball method according to DIN EN 1427:2007 with appropriate application of the provisions (testing of the oligomer or polymer sample instead of bitumen, with the procedure otherwise being retained). The measurements are carried out in a glycerol bath. Reactive resins are understood as being resins which contain functional groups such that they could react, with suitable activation, with further constituents of the pressure-sensitive adhesive—such as, for example, the macromolecules of the polymer components or other reactive resins.

Where a polymer is mentioned within the scope of this specification, it is understood, according to a IUPAC definition, as being a substance composed of a collective of macromolecules (polymer molecules) which are of uniform chemical structure but generally differ in terms of degree of polymerization, molar mass and chain length. In polymers produced by free radical polymerization, the type and (mean) amount of the constitutional units in the macromolecules correspond, while the concrete sequence thereof can vary (random sequence). Within the scope of this specification, the general term polymer includes both homopolymers and copolymers, unless specifically described otherwise.

Substances having properties suitable for pressure-sensitive applications are distinguished by viscoelastic behavior, that is to say by the fact that, under mechanical deformation, they both exhibit viscous flow and develop elastic restoring forces. For good adhesion properties, the pressure-sensitive adhesives should be capable of flowing onto the substrate and ensuring sufficient wetting of the substrate surface. In order to prevent the pressure-sensitive adhesives from flowing off (running down) the substrate and to ensure sufficient stability of the pressure-sensitive adhesive in the adhesive bond, on the other hand, sufficient cohesion of the pressure-sensitive adhesives is required. In order to avoid breaks within the bonded joint (within the pressure-sensitive adhesive layer), a certain elasticity of the pressure-sensitive adhesive is additionally desirable.

In order to achieve the viscoelastic properties, the monomers on which the polymers underlying the pressure-sensitive adhesive are based, as well as the further components of the pressure-sensitive adhesive which are optionally present, are in particular so chosen that the pressure-sensitive adhesive has a glass transition temperature (according to DIN 53765) below the application temperature (that is to say usually below room temperature). In order to achieve sufficient cohesion and elasticity of the pressure-sensitive adhesives of the adhesive tapes, the pressure-sensitive adhesives are generally crosslinked, that is to say the individual macromolecules are linked together by bridge-type bonds. Crosslinking can be carried out in various ways, thus there are physical, chemical or thermal crosslinking methods. By suitable cohesion-increasing measures, such as, for example, crosslinking reactions (formation of bridge-forming linkages between the macromolecules), the temperature range in which a polymer composition has pressure-sensitive adhesive properties can additionally be enlarged and/or displaced. The application range of the pressure-sensitive adhesives can accordingly be optimized, optionally also displaced into the region of room temperature for the first time, by adjusting the flowability (viscosity) and the cohesion of the composition.

In a manner which is very preferred according to the invention, the procedure is that the content of constitutional units attributable to the monomer b) in the main chain is from 1 to 10% by weight and/or the content of constitutional units attributable to the monomer b) in the side chains having a number-average molar mass of at least 1000 g/mol in total is likewise from 1 to 10% by weight, that is to say in each case $1 \leq Y \leq 10$.

Composition of the Polymers and Pressure-Sensitive Adhesives

In the present case it has been found that a polymer as defined above is outstandingly suitable as the basis for pressure-sensitive adhesives which achieve the object set according to the invention. The monomers for the polymer or polymers used are preferably so chosen that the pressure-sensitive adhesive—optionally blended with further components and/or optionally crosslinked—has a glass transition temperature $T_G$ of not more than $-10°$ C., preferably not more than $-15°$ C., in order to achieve the above-mentioned viscoelastic properties at room temperature.

The desired glass transition temperature of copolymers and polymer blends can be controlled by suitably configuring the monomer mixture underlying the polymerization; namely by applying equation (G1) in accordance with the Fox equation (see T. G. Fox, Bull. *Am. Phys. Soc.* 1 (1956) 123):

$$\frac{1}{T_G} = \sum_n \frac{w_n}{T_{G,n}} \quad (G1)$$

In equation (G1), $T_G$ represents the glass transition temperature of the copolymer or polymer blend, n represents the consecutive number (differentiation index) over the monomers used, $w_n$ represents the amount by weight of the respective monomer n (% by weight) and $T_{G,n}$ represents the glass transition temperature of the homopolymer of the respective monomers n in K. By means of a suitable configuration of the monomer mixture it can accordingly also comprise monomers for which the glass transition temperature is above the desired glass transition temperature of the polymer, or pressure-sensitive adhesive, that is to be produced, if that desired glass transition temperature is displaced to lower values again by other monomers that are present.

Within the scope of this specification, glass transition temperatures are given as the result of measurements by means of differential scanning calorimetry DSC according to DIN 53 765; in particular sections 7.1 and 8.1, but with uniform heating and cooling rates of 10 K/min in all the heating and cooling steps (see DIN 53 765; section 7.1; note 1). The original sample weight is 20 mg. Pretreatment of the pressure-sensitive adhesive is carried out (see section 7.1, first pass). Temperature limits: −140° C. (instead of $T_G$−50° C.)/+200° C. (instead of $T_G$+50° C.). The indicated glass transition temperature $T_G$ is the sample temperature in the heating operation of the second pass, in which half the change in the specific heat capacity is achieved.

The glass transition temperatures as a characteristic of the monomers used are specified in relation to their respective homopolymer. Glass transition temperatures of homopolymers relate to the uncrosslinked homopolymer having a number-average molar mass $M_n$ in the horizontal region of the Fox-Flory equation (see T. G. Fox; P. J. Flory, *Journal of Applied Physics* 21 (1950) 581-591), that is to say above the critical value above which the glass transition temperature becomes independent of the mean molar mass; in particular homopolymers whose number-average molar mass $M_n$ is at least 100 000 g/mol.

The monomers chosen are predominantly acrylic monomers, wherein acrylic monomers include derivatives of acrylic acid, derivatives of methacrylic acid as well as the free acids themselves—acrylic acid and methacrylic acid.

There are used as monomers a) particularly advantageously esters of acrylic acid with linear alcohols having from 2 to 14 carbon atoms and/or esters of acrylic acid with branched alcohols having at least 4 carbon atoms and/or esters of methacrylic acid with linear alcohols having from 8 to 10 carbon atoms and/or esters of methacrylic acid with branched alcohols having at least 10 carbon atoms; further N-alkyl-substituted acrylamides, in particular without further heterosubstituents on the nitrogen atom. Examples of monomers of type a) which are very suitable according to the invention are a1) linear n-alkyl acrylates whose corresponding homopolymers have a glass transition temperature of not more than −15° C., such as
ethyl acrylate, n-propyl acrylate, n-butyl acrylate, n-pentyl acrylate, n-hexyl acrylate, n-heptyl acrylate, n-octyl acrylate, n-nonyl acrylate, n-decyl acrylate, n-undecyl acrylate, a2) linear n-alkyl acrylates whose corresponding homopolymers have a glass transition temperature of more than −15° C., such as
methyl acrylate, n-dodecyl acrylate, n-tridecyl acrylate, n-tetradecyl acrylate, stearyl acrylate (n-octadecyl acrylate)

a3) linear n-alkyl methacrylates whose corresponding homopolymers have a glass transition temperature of not more than −15° C., such as
n-octyl methacrylate, n-nonyl methacrylate, n-decyl methacrylate, n-undecyl methacrylate, n-dodecyl methacrylate, n-tridecyl methacrylate, n-tetradecyl methacrylate, n-pentadecyl methacrylate, n-hexadecyl methacrylate, n-heptadecyl methacrylate, stearyl methacrylate (n-octadecyl methacrylate)

a4) linear n-alkyl methacrylates whose corresponding homopolymers have a glass transition temperature of more than −15° C., such as
methyl methacrylate, ethyl methacrylate, n-propyl methacrylate, n-butyl methacrylate, n-pentyl methacrylate, n-hexyl methacrylate, n-heptyl methacrylate, a5) branched alkyl acrylates and methacrylates whose corresponding homopolymers have a glass transition temperature of not more than −15° C., such as
isobutyl acrylate, isopentyl acrylate, isooctyl acrylate, isooctyl methacrylate, 2-ethylhexyl acrylate, 2-ethylhexyl methacrylate, 2-propylheptyl acrylate, a6) heterosubstituted acrylamides, such as
N-isopropylacrylamide, N,N-diisopropylacrylamide, N,N-dibutylacrylamide, N,N-dimethylacrylamide, N,N-diethylacrylamide, N-n-butylacrylamide, N-sec-butylacrylamide, N-tert-butylacrylamide, N-octylacrylamide, N-isopropylacrylamide, N,N-diisopropylacrylamide, N,N-dibutylacrylamide, N,N-dimethylacrylamide, N,N-diethylacrylamide.

There are further used as comonomers radically copolymerizable monomers having at least one acid function (monomers b)). Acrylic monomers are very preferably also chosen here. The acid function is very preferably a carboxy group. Thus it is possible to use, for example, carboxylic acids which contain one or more copolymerizable C—C double bond in the molecule. Acrylic acid is particularly preferably used as the monomer b).

There can optionally also be used as comonomers non-acrylic compounds—that is to say those which are not to be considered as being derivatives of acrylic acid and not as derivatives of methacrylic acid—having at least one double bond, which can be copolymerized with acrylic monomers by means of radical polymerization (monomers c)). If such monomers are present, they are preferably used in a small amount, in particular up to 5% by weight. In particular, compounds having at least one C=C double bond which are copolymerizable with acrylic monomers are used. Such compounds include in particular vinyl compounds, such as, for example, vinyl esters, vinyl ethers, vinyl halides, vinylidene halides, vinyl compounds with aromatic rings and heterocycles, in particular in the α-position relative to the double bond. However, other compounds which are copolymerizable with acrylic monomers can in principle also be used here.

In a preferred embodiment of the invention, the polymer according to the invention alone—that is to say without the admixture of further polymers and resins—and without the addition of further additives (exception: crosslinker substances which may be necessary) can be suitable as the pressure-sensitive adhesive, in particular after crosslinking, namely when the—optionally crosslinked—polymer itself already has pressure-sensitive adhesive properties. This is the case in particular when the polymer itself has a glass transition temperature of not more than −10° C., in particular not more than −15° C. The monomers a) are then chosen predominantly—in an amount of more than 50% by weight; the amount is dependent on the amount of monomers having a higher glass transition temperature and monomers b)—in such a manner that their corresponding homopolymers likewise have a glass transition temperature of not more than −10° C., preferably not more than −15° C.; see above. The wording "alone" is not to rule out the possibility that residues of monomers or macromonomers which have been used are still present in the end product, wherein complete conversion has preferably taken place.

In a further embodiment of the invention, the pressure-sensitive adhesive likewise consists only of the polymer component, that is to say in particular does not contain any resins or—with the exception of crosslinker substances—additives, but the polymer component comprises two or more polymers. In this case too, the polymer component is preferably crosslinked for use as a pressure-sensitive adhesive. In addition to at least one polymer according to the invention, further polymers that are not in accordance with the invention can also be present in the polymer component, particularly preferably the polymer component consists predominantly of polymers according to the invention. Particularly preferably, the polymer component consists only of two or of a plurality of polymers according to the invention, so that no polymers that are not in accordance with the invention are present. This wording is not to rule out the possibility that residues of monomers or macromonomers which have been used are still present in the end product, wherein complete conversion has preferably taken place. The monomers for the preparation of the individual polymer components are preferably so chosen that the—in particular crosslinked—pressure-sensitive adhesive overall has a glass transition temperature of not more than −10° C., preferably of not more than −15° C.

In order to finely adjust the pressure-sensitive adhesive properties or as contributory components to a crosslinking or curing reaction, resins (such as tackifying resins and/or reactive resins) are frequently added to pressure-sensitive adhesives. The pressure-sensitive adhesive according to the invention can, according to the two variant embodiments mentioned above, outstandingly be produced without the admixture of resins, without its suitability as a pressure-sensitive adhesive thereby being adversely affected. It is possible to dispense both with tackifying and thermoplastic resins and with reactive resins. In particular, the absence of resins leads to a particularly residue-free substrate surface after removal of an adhesive tape provided with the corresponding pressure-sensitive adhesive.

It can, however, also be desirable for said fine adjustment to add resins and/or additives to the polymer component. Accordingly, in a third embodiment, the pressure-sensitive adhesive according to the invention can comprise, in addition to the polymer component composed in accordance with one of the two embodiments described above, a resin component—in particular a resin component of one or more adhesive resins—and/or additives conventional for pressure-sensitive adhesives. The monomers for the preparation of the individual polymer components are then preferably in turn so chosen that the—in particular crosslinked—pressure-sensitive adhesive as a whole—that is to say including the added resin or additive—has a glass transition temperature of not more than −10° C., preferably of not more than −15° C. Suitable adhesive resins include natural and/or synthetic resins, as are known in principle to the person skilled in the art as co-components for pressure-sensitive adhesives, for example inter alia colophony and colophony derivatives (colophony esters, also colophony derivatives stabilized by, for example, disproportionation or hydrogenation), polyterpene resins, terpene phenol resins, alkylphenol resins, aliphatic, aromatic and aliphatic-aromatic hydrocarbon resins. Resins that are compatible with (soluble in and/or homogeneously miscible with) the polymer component are very preferably chosen.

Process for the Preparation of the Macromonomers

The polymers according to the invention can advantageously be obtained by providing—in particular mixing together—the monomers group A)
a) one or more acrylic acid esters and/or methacrylic acid esters,
b) one or more radically copolymerizable monomers having at least one acid function,
c) optionally one or more vinyl compounds
and
group B)
d) one or more macromonomers terminally functionalized with groups containing at least one ethylenic double bond and the number-average molecular weight of which is 1000 g/mol or more, and the constitutional units of which are attributable to the monomers
  a) from 80 to 99.5% by weight of one or more acrylic acid esters and/or methacrylic acid esters,
  b) from 0.5 to 15% by weight radically copolymerizable monomers having at least one acid function,
  c) from 0 to 5% by weight vinyl compounds, in such a manner that that initial charge contains from 80 to 95% by weight of the in particular non-polymeric monomers of group A and from 5 to 20% by weight of the macromonomer or macromonomers of group B (data based on the totality of the monomers of monomer groups A and B), wherein the amounts of monomers a) to c) in monomer group A are in the following proportion (data based on monomer group A): a) from 80 to 99.5% by weight acrylic acid esters and/or methacrylic acid esters, b) from 0.5 to 15% by weight radically copolymerizable monomers having at least one acid function, c) from 0 to 5% by weight vinyl compounds, and the initial charge is subjected to free radical polymerization.

Preparation of the Terminal-Group-Functionalized Macromolecules

The polymers according to the invention can outstandingly be prepared by using terminal-group-functionalized macromonomers containing the required amount of acrylic acid as comonomers in the polymerization, in particular as comonomers for a free radical polymerization. Advantageously, the macromonomers have one terminal group per macromolecule. The functions of the terminal groups are so chosen that they are copolymerizable with acrylic monomers, in particular that they have an olefinic double bond. The end group can in particular be or contain an acryloyl, a methacryloyl or a vinyl group, particularly preferably be or contain an acryloylamido or a methacryloylamido group.

During the radical polymerization, the macromonomers are incorporated via the double bonds of their terminal functional groups into the resulting polymers in such a manner that the macromolecules are attached as side chains to the main chains synthesized by the monomers of monomer group A, the length of which (expressed via their number-average molecular weight) corresponds to the number-average molecular weight of the prior macromolecules. The constitutional units of the polymer main chain attributable to the earlier terminal functional groups of the macromolecules can thereby be disregarded as portions of the main chain (and accordingly when stating the composition thereof).

The proportions are preferably so chosen that there are on average from 1 to 5, particularly preferably from 1 to 3, side chains per polymer molecule.

Within the scope of the amounts permitted in each case, the monomers a), b) and c) of monomer group A in the initial charge can be chosen independently of the amounts of the constitutional units in the macromonomers attributable to the monomers a), b) and c). However, the composition of the monomers a), b) and c) in monomer group A) is preferably so chosen that, in the resulting polymer, the amounts of the constitutional units attributable to the monomers a), b) and c) in the main chain (the constitutional units originating from the monomers of monomer group A) and the amounts of the constitutional units attributable to the corresponding monomer types a), b) and c) in the side chains are close to one another, in particular differ from one another by not more than one percentage point (% by weight; in each case based on the totality of the monomers a), b) and c) in the main chain and in the side chains (in total)). Particularly preferably, the composition of the constitutional units—based on the constitutional units attributable to the respective amount of monomers a), b) and c)—in the main chain and in the side chains correspond.

Very preferably, in each of the three cases mentioned above, the individual side chains have the same composition—based on the respective amount of the constitutional units attributable to the monomers a), b) and c)—but it is in principle also possible that the side chains vary in terms of their composition within the scope of the indicated limits.

Particularly preferably, the procedure is such that both the monomers chosen specifically and the respective amounts thereof in the main chain and in the side chains (in total) correspond.

The terminal-group-functionalized macromonomers can be obtained, for example, by means of radical polymerization using difunctional regulators, wherein the regulators are in particular so chosen that, as well as comprising a strongly regulating functional group —$R_{F1}$, they also comprise a group $R_{F2}$ without or with a weak regulating action (in the following, the molecule part of the regulator bonding the functional groups will be denoted $R_M$). Preferably, the regulator ($R_{F1}$-$R_M$-$R_{F2}$) is so chosen that, in the polymerization reaction carried out to prepare the macromonomers—that is to say with chosen monomer concentrations and solvents—the transfer constant of the second functional group ($R_{F2}$) is lower at least by a factor of 10, preferably at least by a factor of 100, than the transfer constant of the strongly regulating functional group ($R_{F1}$). In particular, it has been found to be advantageous to choose a thiol function (—SH) as the strongly regulating group —$R_{F1}$ and a hydroxy group, a carboxy group or an amino group (—$NH_2$—NHR) as the weakly regulating functional group —$R_{F2}$. Such difunctional regulators have been found to be very advantageous for free radical reactions for all common solvents and in the indicated monomer limits.

Examples of suitable regulators which may be mentioned are 2-aminoethanethiol hydrochloride, 2-mercaptoethanol, 3-mercaptopropionic acid, 2-mercaptopropionic acid and 2-mercaptoacetic acid.

There are particularly preferably used as regulators those regulators in which the functional group —$R_{F2}$ is a hydroxy group, such as 2-mercaptoethanol, 3-mercaptopropanol, 4-mercaptobutanol, 5-mercaptobutanol, 6-mercaptohexanol, 11-mercaptoundecanol, 16-mercaptohexadecanol, 1-mercapto-2-propanol, 3-mercapto-1-propanol, 3-mercapto-1-hexanol.

During the regulated polymerization, which can take place in solution, without a solvent or in the melt, the polymer chains grow on the regulator radical, which has assumed the radical function in the transfer ($\cap$S—$R_M$—$R_{F2}$), randomly, until the growth is terminated by a transfer reaction or another radical termination reaction. Narrowly distributed macromolecules are thereby obtained. It may be advantageous to protect the second functional group —$R_{F2}$ during the polymerization, for example by converting it into a salt.

In a second reaction step, the functional groups —$R_{F2}$—optionally after being deprotected—are converted into groups that are copolymerizable with acrylates, in particular into acryloyl groups, acryloylamido groups, methacryloyl groups, methacryloylamido groups or vinyl groups. The reactions known to the person skilled in the art in which a functional group can be converted into a different functional group can be used for that purpose, for example esterifications, transesterifications, amidations.

The introduction of the copolymerizable functional group into the macromolecules can take place by the following reaction partners, to mention only a few examples: methacrylic anhydride, glycidyl methacrylate (in the case of carboxy-terminated macromolecules, very preferably catalyzed, for example with N,N-dimethyldodecylamine as catalyst), 2-isocyanatoethyl methacrylate, 2-isocyanatoethyl acrylate, methacrylic acid chloride (in particular in the presence of triethylamine); acrylic acid chloride (in particular in the presence of triethylamine).

In particular in the above-mentioned cases in which there are used regulators in which the functional group —$R_{F2}$ is a hydroxy group, there are used as reaction partners very preferably polymerizable anhydrides, such as, for example, acrylic anhydride and/or methacrylic anhydride and/or itaconic anhydride. A selective reaction at the terminal hydroxy groups is thereby ensured without the occurrence of secondary reactions with acid groups in the polymer chains that are introduced by polymerization (attributable in particular to components b).

The temperature management is dependent on the chosen initiator and the chosen solvent.

By means of the mentioned process it is possible to obtain terminal-group-functionalized copolymerizable macromonomers with incorporated acid functions. By using the regulators with two different transfer constants and selective reaction management in the reaction of the functional group —$R_{F2}$, the copolymerizable groups are incorporated only terminally and do not react with the acid groups in the chain. As a result, it is possible to prepare (acrylic) acid-containing macromonomers which react inter alia with further acid-containing comonomers (in particular carboxylic acids, such as acrylic acid), and thus to produce the polymers according to the invention.

The polymers according to the invention—preferably the polymers according to the invention produced by the above process—are very preferably crosslinked for use as a pressure-sensitive adhesive. To that end there are mixed with the polymer, in particular when the polymerization has taken place, crosslinker substances (also referred to simply as crosslinkers), in particular those which are able to react with the acid groups of the monomers b), in particular with acrylic acid, within the meaning of a network-building reaction (linking reactions between the individual macromolecules). If the crosslinkers are inert with respect to the polymerization reaction, they can in an alternative procedure be added to the monomer mixture additionally or solely before the end of the polymerization or in the course of the polymerization process.

Suitable crosslinkers for the polymers according to the invention are, for example, metal chelates, in particular aluminum chelates, also N,N-diglycidylamines, epoxides, isocyanates, aziridines.

Metal chelates are used particularly preferably in an amount of from 0.15 to 0.4 part by weight, based on 100 parts by weight of the polymer to be crosslinked. Aluminum (III) acetylacetonate (CAS No. 13963-57-0), for example, is particularly suitable.

N,N-Diglycidylamines are used preferably in an amount of from 0.025 to 0.1 part by weight, based on 100 parts by weight of the polymer to be crosslinked. The product Erisys™ GA 240 from CVC (CAS No. 63738-22-7), for example, has been found to be very suitable.

Epoxides are used preferably in an amount of from 0.1 to 0.4 part by weight, based on 100 parts by weight of the polymer to be crosslinked. A preferred commercially available epoxide is Uvacure™ 1500 (CAS No. 2386-87-0) from Cytec.

Isocyanates are used preferably in an amount of from 0.1 to 0.4 part by weight, based on 100 parts by weight of the polymer to be crosslinked. Desmodur™ N 3300 from Bayer (CAS No. 28182-81-2), for example, is very suitable according to the invention.

Aziridines are used preferably in an amount of from 0.05 to 0.2 part by weight, based on 100 parts by weight of the polymer to be crosslinked. A suitable representative of this group is, for example, Xama™ 7 from Ichemco (CAS No. 57116-45-7).

A field of use for which the pressure-sensitive adhesives according to the invention are particularly suitable is the bonding of printing plates to printing cylinders, as already mentioned at the beginning. By the combination of a low but sufficiently high adhesive force to the substrate, which is accompanied by a sufficiently high initial force for detaching the bond again, but a high total work which must be applied in order to detach the adhesive tape completely from the substrate, reliable bonding of the printing plate is provided and there is no detachment at the edges; nevertheless, the adhesive tapes can be detached from different cylinder materials again without leaving a residue.

EXAMPLES

The invention will be described in greater detail below by means of examples. In addition to the test methods already described above, the following methods are used:
S.A.F.T.—Shearadhesive Failure Temperature This test serves to quickly test the shear strength of adhesive tapes under temperature load.
Preparation of the Test Samples:

The adhesive tape sample (pressure-sensitive adhesive coated onto 50 μm PET film) is bonded to a ground steel test plate cleaned with acetone and then rolled six times using a 2 kg steel roller and a speed of 10 m/min. The bonding area of the sample is height×width=13 mm×10 mm, the sample is suspended vertically, protrudes beyond the steel test plate by 2 mm at the upper edge and is strengthened flush with a stable adhesive strip, which serves as support for the distance measuring sensor.
Measurement:

The sample to be measured is loaded at the bottom end with a weight of 50 g. The steel test plate with the bonded sample is heated to the final temperature of 200° C. at a rate of 9° C. per minute, starting at 25° C. The slip distance of the sample is measured by means of a distance measuring sensor in dependence on the temperature and time. The maximum slip distance is set at 1000 μm; if that value is exceeded, the test is terminated. Test climate: room temperature 23±3° C., relative humidity 50±5%.
Positive Test Result:
 slip distance after reaching the final temperature (200° C.), in μm.
Negative Test Result:
 temperature upon reaching the maximum slip distance (1000 μm), in ° C.
Microshear Distance Test (Test B)

This test serves to test the shear strength of adhesive tapes under a temperature load of 40° C.
Preparation of the Test Samples:

As the sample to be tested, a strip of the specimen described above was bonded to a polished, temperature-controlled steel test plate cleaned with acetone and then rolled six times using a 2 kg steel roller and a speed of 10 m/min. The bonding area of the sample was height×width=13 mm×10 mm, the sample was suspended vertically, protruded beyond the steel test plate by 2 mm at the upper edge and was strengthened flush with a stable adhesive strip, which served as support for the distance measuring sensor.
Measurement:

The sample to be measured was loaded at the bottom end with a weight of 100 g. The steel test plate with the bonded sample was heated to 40° C. The deformation of the sample was measured by means of a distance measuring sensor over a period of 15 minutes. The test was carried out at a room temperature of 23±3° C. and a relative humidity of 50±5%.
Tests The effect obtained by the composition of the polymers according to the invention was investigated in experiments. Examples 1 to 15 describe pressure-sensitive adhesives according to the invention and Examples C16 to C23 describe comparative tests.
Preparation of Macromers The amounts used for the following reaction can be found in Table 1.

A 0.5-liter glass reactor conventional for radical polymerizations was filled with 2-ethylhexyl acrylate (EHA), optionally acrylic acid (AA) and mercaptoethanol (ME). After nitrogen gas had been passed through for 45 minutes, with stirring, Vazo® 67 (2,2'-azobis(2-methylbutyronitrile, DuPont) was added. The external heating bath was then heated to 75° C. and the reaction was carried out constantly at that external temperature.

After a reaction time of 15 hours, unreacted monomer and 2-mercaptoethanol were removed in vacuo at 120° C. An equimolar amount, relative to the amount of mercaptoethanol used, of methacrylic anhydride was then added. The reaction was carried out for a further 12 hours at a heating bath temperature of 100° C. in order to obtain the oligomer terminal-group-functionalized with an olefinic double bond, the macromonomer. The methacrylic acid formed in the reaction was removed in vacuo at 120° C.

TABLE 1

|  | 2-EHA | AA | ME | Vazo ®67 | Methacrylic anhydride |
| --- | --- | --- | --- | --- | --- |
| 1-3 | 99 g | 1 g | 1.72 g | 0.53 g | 3.40 g |
| 4-6, C23 | 95 g | 5 g | 1.83 g | 0.53 g | 3.61 g |
| 7-9 | 95 g | 5 g | 0.91 g | 0.53 g | 1.80 g |
| 10-12 | 90 g | 10 g | 1.96 g | 0.53 g | 3.87 g |

TABLE 1-continued

|  | 2-EHA | AA | ME | Vazo ®67 | Methacrylic anhydride |
|---|---|---|---|---|---|
| 13-15 | 85 g | 15 g | 2.09 g | 0.53 g | 4.13 g |
| C17-C19 | 100 g | — | 1.70 g | 0.53 g | 3.35 g |
| C20-C22 | 100 g | — | 0.85 g | 0.53 g | 1.67 g |

Preparation of the Comb Polymer

A 2.5-liter glass reactor conventional for radical polymerizations was filled with 2-ethylhexyl acrylate (EHA), acrylic acid (AA) and the respective macromonomer. The amounts can be found in Table 2. 266.7 g of ethyl acetate is then added to the monomer mixture. After nitrogen gas had been passed through for 45 minutes, with stirring, the reactor was heated to 58° C. and 0.2 g of Vazo® 67 was added. The external heating bath was then heated to 70° C. and the reaction was carried out constantly at that temperature. After a reaction time of 1 hour, a further 0.2 g of Vazo® 67 was added. Over a period of 5 hours, the mixture was diluted with in each case from 100 g to 200 g of ethyl acetate hourly, according to the viscosity increase. In order to reduce the residual monomers, 0.6 g of bis-(4-tert-butylcyclohexyl) peroxy dicarbonate was added after 6 hours and after 7 hours, and the mixture was in the meantime diluted with 100 g of ethyl acetate. The reaction was terminated after a reaction time of 24 hours and cooled to room temperature.

TABLE 2

| Test example | EHA | AA | Macromer |
|---|---|---|---|
| 1 | 376.2 g | 3.8 g | 20 g |
| 2 | 356.4 g | 3.6 g | 40 g |
| 3 | 316.8 g | 3.2 g | 80 g |
| 4 | 361 g | 19 g | 20 g |
| 5 | 342 g | 18 g | 40 g |
| 6 | 304 g | 16 g | 80 g |
| 7 | 361 g | 19 g | 20 g |
| 8 | 342 g | 18 g | 40 g |
| 9 | 304 g | 16 g | 80 g |
| 10 | 342 g | 38 g | 20 g |
| 11 | 324 g | 36 g | 40 g |
| 12 | 288 g | 32 g | 80 g |
| 13 | 323 g | 57 g | 20 g |
| 14 | 306 g | 54 g | 40 g |
| 15 | 272 g | 48 g | 80 g |
| C16 | 380 g | 20 g | 0 g |
| C17 | 361 g | 19 g | 20 g |
| C18 | 342 g | 18 g | 40 g |
| C19 | 304 g | 16 g | 80 g |
| C20 | 361 g | 19 g | 20 g |
| C21 | 342 g | 18 g | 40 g |
| C22 | 304 g | 16 g | 80 g |
| C23 | 266 g | 14 g | 120 g |

Results

There were varied the amount of acrylic acid in the polymer and in the macromonomers used, which amount is found again in the polymer as the amount in the side chains (in each case 1, 5, 10 or 15% by weight, based on the polymer or based on the macromonomers used; also lower and higher in the comparative tests); the macromer concentration in the monomer mixture used, which corresponds to the amount (in % by weight) taken up by side chains in the polymer (in each case 5, 10 or 15% by weight, based on the monomer mixture used, in the comparative test also without the use of macromonomer) and the chain length of the macromonomers used.

For the examples according to the invention, it is found that the parameters initial force ("$F_{max}$") and work ("Integral") behave contrarily (as the macromonomer concentration in the polymer increases, the initial force falls while the detachment work increases). For linear polyacrylates, it is known that with measures which increase the initial force, the total detachment work also increases (for example the addition of suitable resins which increase the adhesive force), while measures that reduce the initial force also reduce the total detachment work. Comparative tests C17 to C19 and C20 to C22 show that a similar trend of initial force and detachment work is to be observed for polymers having side chains that have a number-average molecular weight of more than 2000 g/mol but that do not contain acrylic acid units. The total amount of acrylic acid in the polymer, which here corresponds to Examples 4 to 6 according to the invention, is thus not an adequate condition for the behavior noted according to the invention. It is likewise problematic (again with the same amount of acrylic acid, based on the polymer) when the acrylic acid units are displaced mainly into the side chains:

If the amount of side chains on the polymer molecule becomes too great (if the amount of component b) for introduction of the side chains increases in particular above 20% by weight; see Example C23), then the adhesive forces fall even if the amount of acrylic acid in the main chain and the side chains is distributed equally and is in the range that is advantageous per se, and become too low.

TABLE 3

| | | Macromer | | Microshear | | | Sample tack | |
|---|---|---|---|---|---|---|---|---|
| | Amount of | Amount of | | | distance | | | |
| | AA | AA | Macromer | | Elastic | | | |
| Test/ Example | total [wt. %][1] | macromer [wt. %][2] | concentration [wt. %][1] | Maximum [μm] | component [%] | SAFT [° C.] | Fmax [N] | Integral [Nmm] |
| Examples according to the invention (AA in the main and side chain) | | | | | | | | |
| 1 | 1 | 1 | 5 | 485 | 76 | 155 | 1.103 | 0.243 |
| 2 | 1 | 1 | 10 | 412 | 77 | 158 | 1.095 | 0.269 |
| 3 | 1 | 1 | 20 | 285 | 79 | 162 | 1.082 | 0.281 |
| 4 | 5 | 5 | 5 | 188 | 80 | 165 | 1.382 | 0.119 |
| 5 | 5 | 5 | 10 | 174 | 86 | 162 | 1.388 | 0.148 |
| 6 | 5 | 5 | 20 | 124 | 85 | 170 | 1.241 | 0.163 |
| 7 | 5 | 5 | 5 | 178 | 81 | 165 | 1.693 | 0.123 |
| 8 | 5 | 5 | 10 | 165 | 86 | 164 | 1.398 | 0.158 |
| 9 | 5 | 5 | 20 | 122 | 86 | 169 | 1.245 | 0.187 |

TABLE 3-continued

| | | Macromer | | Microshear distance | | | Sample tack | |
|---|---|---|---|---|---|---|---|---|
| | Amount of AA | Amount of AA | Macromer | | Elastic | | | |
| Test/ Example | total [wt. %]$^{(1)}$ | macromer [wt. %]$^{(2)}$ | concentration [wt. %]$^{(1)}$ | Maximum [μm] | component [%] | SAFT [° C.] | Fmax [N] | Integral [Nmm] |
| 10 | 10 | 10 | 5 | 125 | 84 | 180 | 1.556 | 0.111 |
| 11 | 10 | 10 | 10 | 112 | 85 | 182 | 1.536 | 0.118 |
| 12 | 10 | 10 | 20 | 99 | 85 | 181 | 1.513 | 0.127 |
| 13 | 15 | 15 | 5 | 75 | 84 | >200 | 1.545 | 0.112 |
| 14 | 15 | 15 | 10 | 73 | 86 | >200 | 1.542 | 0.122 |
| 15 | 15 | 15 | 20 | 71 | 85 | >200 | 1.541 | 0.134 |
| Comparative examples | | | | | | | | |
| C16 | 5 | No macromer | | 265 | 79 | 175 | 1.474 | 0.113 |
| C17 | 5 | 0 | 5 | 311 | 75 | 162 | 1.599 | 0.115 |
| C18 | 5 | 0 | 10 | 150 | 78 | 169 | 1.586 | 0.089 |
| C19 | 5 | 0 | 20 | 122 | 86 | 172 | 1.364 | 0.056 |
| C20 | 5 | 0 | 5 | 231 | 76 | 163 | 1.716 | 0.117 |
| C21 | 5 | 0 | 10 | 168 | 80 | 167 | 1.064 | 0.058 |
| C22 | 5 | 0 | 20 | 128 | 85 | 172 | 0.644 | 0.031 |
| C23 | 5 | 5 | 30 | 99 | 96 | 120 | 0.423 | 0.031 |

AA = acrylic acid
$^{(1)}$based on the total monomer mixture used (monomer groups A + B)
$^{(2)}$based on the macromonomers used Characterization of the Macromonomers Used

TABLE 4

| Examples | Comonomers | Amount of AA [wt. %] | Mn [g/mol] | PDI [—] |
|---|---|---|---|---|
| 1-3 | AA, EHA | 1 | 2800 | 1.7 |
| 4-6, C23 | AA, EHA | 5 | 2600 | 1.5 |
| 7-9 | AA, EHA | 5 | 5600 | 1.6 |
| 10-12 | AA, EHA | 10 | 2600 | 1.5 |
| 13-15 | AA, EHA | 15 | 2600 | 1.8 |
| C17-C19 | EHA | — | 2500 | 1.5 |
| C20-C22 | EHA | — | 5500 | 1.7 |

AA = acrylic acid
EHA = 2-ethylhexyl acrylate
Mn = number-average molecular weight
PDI = polydispersity

The invention claimed is:

1. A polymer having a main chain, comprising monomers A), and one or more side chains, comprising macromolecules B), located on the main chain, wherein the constitutional units of the monomers A) and the macromolecules B) are attributable to the following monomers
   a) X % by weight of one or more acrylic acid esters and/or methacrylic acid esters, wherein 80≤X≤99.5;
   b) Y % by weight radically copolymerizable monomers having at least one acid function, wherein 0.5≤Y≤15;
   c) Z % by weight vinyl compounds, wherein 0≤Z≤5
and X+Y+Z is 100,
wherein
at least one side chain of the one or more side chains located on the main chain has a number-average molar mass of at least 1000 g/mol and
the content X, Y and Z of constitutional units attributable to the individual monomers a), b) and c) both in the main chain and in the side chains having a number-average molar mass of at least 1000 g/mol in total is in each case be the same or different,
wherein, in the case where the content is different, an upwards or downwards deviation of not more than 1% is present in each case,
wherein the monomers a), b) and c) for the main chain and side chains is in each case the same monomers or different monomers.

2. The polymer as claimed in claim 1, wherein 1≤Y≤10.

3. The polymer as claimed in claim 1, wherein the number of side chains having a number-average molar mass of 1000 g/mol or more is between 1 and 5 in the predominant number of macromolecules.

4. The polymer as claimed in claim 1, wherein the number-average molecular weight of the polymer is between 100 000 g/mol and 1 500 000 g/mol.

5. The polymer as claimed in claim 1, wherein there are chosen as monomers a) wholly or predominantly those acrylic acid esters and/or methacrylic acid esters whose homopolymers have a glass transition temperature (differential scanning calorimetry according to DIN 53 765; heating rate 10 K/min) of not more than −10° C.

6. The polymer as claimed in claim 1, wherein there are chosen as monomers a) wholly or predominantly esters of acrylic acid with linear primary alcohols having from 3 to 10 carbon atoms in the alcohol moiety and/or esters of methacrylic acid with linear primary alcohols having more than 8 carbon atoms in the alcohol moiety.

7. The polymer as claimed in claim 1, wherein there are chosen as monomers b) one or more carboxylic acids.

8. The polymer as claimed in claim 7, wherein acrylic acid is chosen as the monomer b).

9. The process for the preparation of a polymer as claimed in claim 1, wherein the amounts X, Y and Z of monomers a), b) and c) for monomer group A and monomer group B are the same.

10. The polymer according to claim 1, further comprising:
   one or more crosslinker substance present in an amount of from 0.025 to 0.4 by weight based on 100 parts by weight of the polymer to be crosslinked.

11. The polymer according to claim 10, wherein the one or more crosslinker substances are selected from the group consisting of metal chelates, N,N-Diglycidylamines, epoxides and aziridines.

12. The polymer according to claim 10, wherein the one or more crosslinker substances consists of isocyanates present in the amount of from 0.1 to 0.4 part by weight, based on 100 parts by weight of the polymer to be crosslinked.

13. A pressure-sensitive adhesive having a polymer component comprising the polymer according to claim 1, wherein the pressure-sensitive adhesive is crosslinked.

14. The pressure-sensitive adhesive as claimed in claim 13, wherein the polymer component comprises only one or more polymers as claimed in claim 1.

15. The pressure-sensitive adhesive as claimed in claim 13, wherein it is free of resin.

16. A process for the preparation of a polymer as claimed in claim 1, wherein the polymer is produced by free radical polymerization from a monomer group mixture comprising
- A) W % by weight [based on the monomer mixture comprising monomer groups A) and B)] of the following monomers
  - a) X % by weight [based on monomer group A)] of one or more acrylic acid esters and/or methacrylic acid esters, wherein $80 \leq X \leq 99.5$;
  - b) Y % by weight [based on monomer group A)] radically copolymerizable monomers having at least one acid function, wherein $0.5 \leq Y \leq 15$;
  - c) Z % by weight [based on monomer group A)] vinyl compounds, wherein $0 \leq Z \leq 5$ and
- B) (100-W) % by weight [based on the monomer mixture comprising monomer groups A) and B)] of the following macromonomers
  - d) macromonomers terminally functionalized by groups containing at least one ethylenic double bond and the number-average molecular weight of which is 1000 g/mol or more and the constitutional units of which are in turn attributable to the monomers
    - a) X % by weight of one or more acrylic acid esters and/or methacrylic acid esters, wherein $80 \leq X \leq 99.5$;
    - b) Y % by weight radically copolymerizable monomers having at least one acid function, wherein $0.5 \leq Y \leq 15$;
    - c) Z % by weight vinyl compounds, wherein $0 \leq Z \leq 5$, wherein $80 \leq W \leq 95$, wherein the monomers a), b) and c) for monomer group A) and monomer group B) is in each case the same monomers or different monomers, and wherein the amounts X, Y and Z of monomers a), b) and c) for monomer group A) and monomer group B is in each case the same amounts or different amounts, wherein, in the case where the amounts are different amounts, an upwards or downwards deviation of not more than 1% is present in each case.

17. The process for the preparation of a polymer as claimed in claim 16, wherein the monomers a), b) and c) for monomer group A and monomer group B are the same monomers.

\* \* \* \* \*